United States Patent
Hülsebusch et al.

(10) Patent No.: US 7,000,492 B2
(45) Date of Patent: Feb. 21, 2006

(54) AXIAL ADJUSTING DEVICE WITH SPRING SUPPORT DURING THE RETURN MOTION

(75) Inventors: Karl-Heinz Hülsebusch, Köln (DE); Holger Seidl, Siegburg (DE); Frank Böttger, Köln (DE); Alexey Katsnelson, Düsseldorf (DE); Raymond LeGallais, Birmingham (GB); Nikolaus Mayr, Reischach/Bruneck (IT)

(73) Assignee: GKN Automotive GmbH, (DE)

(*) Notice: Subject to any disclaimer, the term of this patent is extended or adjusted under 35 U.S.C. 154(b) by 109 days.

(21) Appl. No.: 10/175,370

(22) Filed: Jun. 19, 2002

(65) Prior Publication Data

US 2002/0194941 A1 Dec. 26, 2002

(30) Foreign Application Priority Data

Jun. 20, 2001 (DE) ................................ 101 29 795

(51) Int. Cl.
*F16H 25/08* (2006.01)

(52) U.S. Cl. ........................................... 74/57; 74/567
(58) Field of Classification Search ............... 192/84.6, 192/84.7; 74/56, 57, 89.16, 89, 567, 574
See application file for complete search history.

(56) References Cited

U.S. PATENT DOCUMENTS

| | | | | |
|---|---|---|---|---|
| 3,118,292 A | * | 1/1964 | Schroter | 464/36 |
| 3,443,446 A | * | 5/1969 | Buergel | 74/56 |
| 4,465,172 A | * | 8/1984 | Gatewood | 192/201 |
| 4,828,533 A | * | 5/1989 | Focqueur et al. | 464/24 |
| 5,004,082 A | * | 4/1991 | Sakakibara et al. | 192/3.26 |
| 5,160,004 A | * | 11/1992 | Scott et al. | 192/17 R |
| 5,454,459 A | * | 10/1995 | Sadakari et al. | 192/55.61 |
| 5,464,084 A | * | 11/1995 | Aoki et al. | 192/35 |
| 5,518,100 A | * | 5/1996 | Birk et al. | 192/208 |
| 5,551,928 A | * | 9/1996 | Sudau | 475/347 |
| 5,646,355 A | * | 7/1997 | Fukushima et al. | 73/862.195 |
| 6,082,504 A | * | 7/2000 | Organek et al. | 188/72.7 |
| 6,247,571 B1 | * | 6/2001 | Nakane et al. | 192/205 |
| 6,408,717 B1 | * | 6/2002 | Young et al. | 74/574 |

FOREIGN PATENT DOCUMENTS

| | | |
|---|---|---|
| DE | 38 15 225 C2 | 7/1990 |
| DE | 196 50 039 A1 | 6/1997 |
| DE | 196 09 429 | * 9/1997 |
| DE | 100 33 482 | * 10/2001 |

* cited by examiner

Primary Examiner—William C. Joyce

(57) ABSTRACT

An axial adjusting device includes two discs which are rotatable relative to one another and coaxially supported relative to one another, between which two discs balls are guided in pairs of ball grooves. The depth of the pairs of ball grooves is variable across the circumference of the discs. One of the discs is axially supported and one is axially displaceable against resilient returning forces of a first spring mechanism. At least one of the discs can be driven by a motor via a gear drive. A second spring mechanism is provided which—during the return motion of the discs, after the balls have reached their end positions in the ball grooves, which end positions are determined by the greatest groove depth—permit the drivable disc to overshoot against the resilient returning forces of the second spring mechanism.

12 Claims, 11 Drawing Sheets

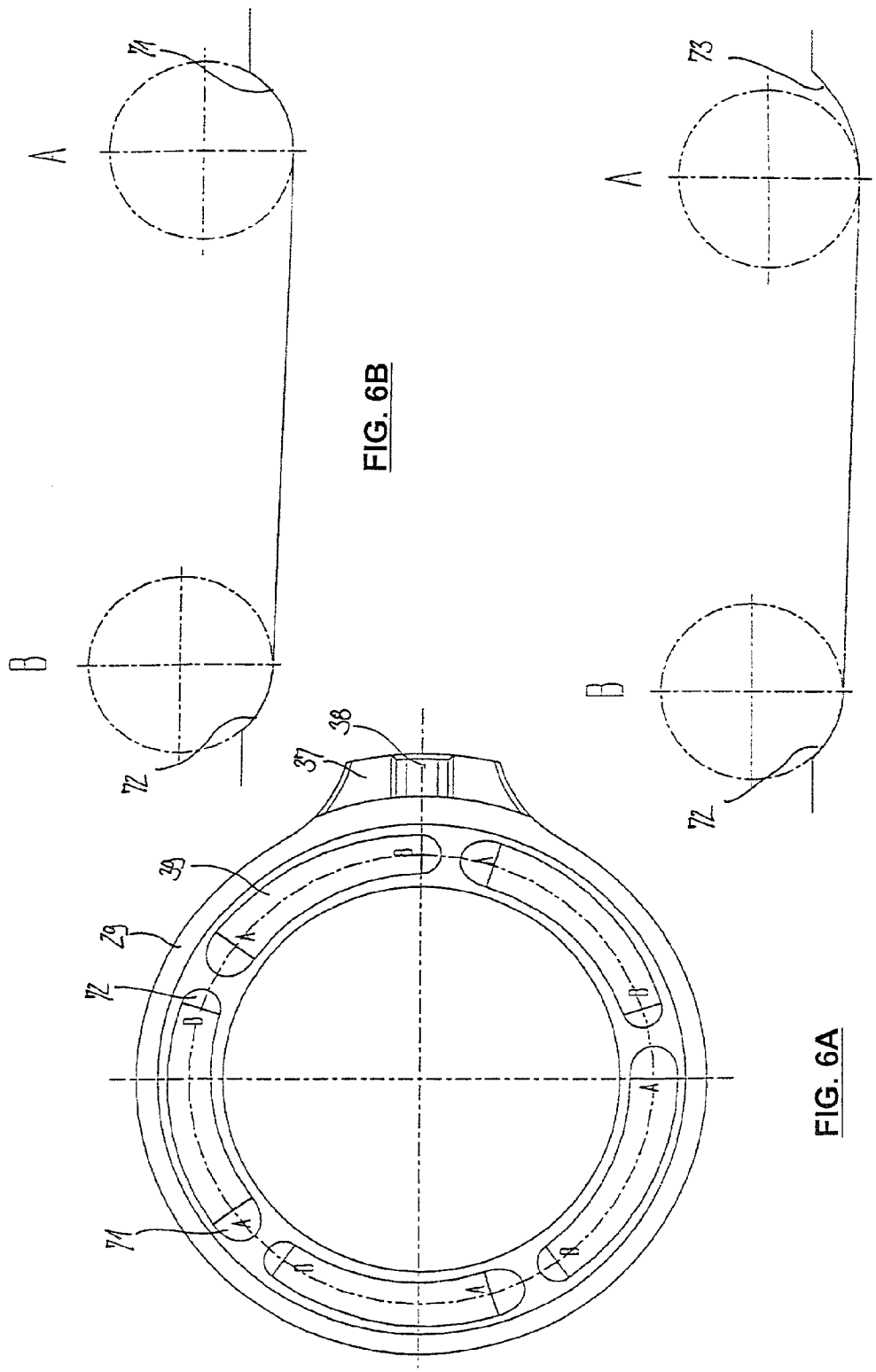

AXIAL ADJUSTING DEVICE WITH SPRING SUPPORT DURING THE RETURN MOTION

TECHNICAL FIELD

The present invention relates to an axial adjusting device. In particular, the invention concerns an axial adjusting device with a spring support during the return motion.

BACKGROUND OF THE INVENTION

The invention relates to an axial adjusting device having two discs which are rotatable relative to one another and coaxially supported relative to one another. Between the two discs, balls are guided in pairs of ball grooves in the discs. The depth of the pairs of ball grooves is variable across the circumference of the discs. One of the discs is axially supported and one is axially displaceable against resilient returning forces of the spring mechanism. At least one of the discs can be driven rotatably by a motor via a gear drive.

In this embodiment, a rotatingly driven disc can, at the same time, constitute the axially displaceable disc, but this is an exception. Normally, the supported disc is rotatingly driven and the axially displaceable disc which, in turn, is supported thereon via the balls, is held in a rotationally fast way.

For the purpose of actuating the axial adjusting device, the motor is driven in a first direction of rotation, with the at least one disc coupled to the motor via reduction stages being rotated and with the axially displaceable disc which, in turn, supports itself on the axially supported disc, being axially displaced against resilient returning forces of the spring mechanism.

As a result of the discs rotating relative to one another, the balls, which rest in pairs of ball grooves against end positions and which, at the same time, are positioned therein in the deepest groove portions, run towards shallower groove portions. As a result, the discs are pushed away from one another.

If the motor is driven in the opposite direction or is switched so as to be current-free, the displaceable disc is pushed back by the resilient returning forces applied thereto by the spring means and the at least one rotatably drivable disc is rotated back actively by the motor or as a result of the effect of the balls in the ball grooves until the balls in their pairs of ball grooves stop against the end positions simultaneously. As a result of the balls stopping in this way against the ends of the ball grooves, the rotating masses of this system, i.e., the rotatable one of the discs, the gears of the gear drive and the shaft of the motor with the rotor mass, are stopped abruptly.

Even elastic deformation of the motor shaft caused by the pulse generated as a result of the rotating masses stopping abruptly, can lead to tooth fracture at the pinion or at the set of gears. This is because, when the motor shaft is bent, the points of force application in the toothings move outwardly, resulting in loads acting on the pinion or the set of gears exceeding the design loads.

SUMMARY OF THE INVENTION

It is therefore an object of the present invention to provide a design which is able to accommodate, in a damage-free way, the pulse generated when the above-mentioned rotating masses are braked after the balls have been stopped.

According to a first solution, there is provided a second spring mechanism which—during the return motion of the discs, after the balls have reached their end positions in the ball grooves, which end positions are determined by the greatest groove depth—permit the drivable disc to overshoot against the resilient returning forces of the second spring mechanism. As a result of the second spring mechanism, it is ensured that, up to a limited extent, it is possible for the current-free motor or, optionally, for the electrically braked motor, to continue to rotate without being overloaded, with the rotating masses then being spring suspended and, preferably, additionally, being braked by a damping process.

According to one embodiment, one of the gears of the gear drive comprises hub elements and gear rim elements which are separate from one another and which are resiliently supported relative to one another by the second spring mechanisms. The second spring mechanisms are helical pressure springs which are positioned in the hub and gear rim elements in the circumferential direction.

According to a further embodiment, the undriven disc of the discs is held by a holding element in the housing in a rotationally fast way. The holding element is supported by a second spring mechanism so as to be resiliently deflectable. The holding element, in particular, is a holding pin which is radially displaceable relative to the disc, and which engages a resting trough at the disc edge and is resiliently supported in the housing via pressure springs.

According to another embodiment, in the region following the end position determined by the greatest groove depth, the ball grooves comprise a rising run-out portion. The second spring mechanism is provided for returning the axially displaceable disc. In particular, the spring mechanism can be formed by helical pressure springs arranged so as to extend in an axis-parallel way relative to the disc.

According to a second solution, there is provided a second spring mechanism which, during the return motion of the discs, prior to the balls reaching end positions in the ball grooves, corresponding to a greatest groove depth, is resiliently pretensioned against a returning force. In this way, it is ensured that even before the balls stop against end positions in the ball grooves, the rotating masses are resiliently spring-suspended and, in particular, the spring movement is additionally dampened. There is no need for any overshooting after the end positions have been reached. The first solution, above, may also be combined with the second solution, herein.

In a further embodiment, the second spring mechanism is formed by a leaf spring which is fixed to one of the discs and whose free end co-operates with a stop at the other one of the discs. For dampening purposes, the free end of the leaf spring can slide along the other one of the discs before the end stop is reached.

According to a still further embodiment, the second spring mechanism is formed by an elastic rubber or plastic element which is fixed to one of the discs and co-operates with a stop at the other one of the discs. In particular, the rubber or plastic element can include suitable internal damping means.

Preferred embodiments of the invention are illustrated in the drawings and will be described below. Other advantages and features of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIG. 6 shows one of the discs according to FIG. 5 in the form of a detail:
 A) in an axial view;
 B) with a ball groove shape according to FIGS. 1–4; and
 C) with a ball groove shape according to FIG. 5.

DETAILED DESCRIPTION OF THE INVENTION

Figure 1:
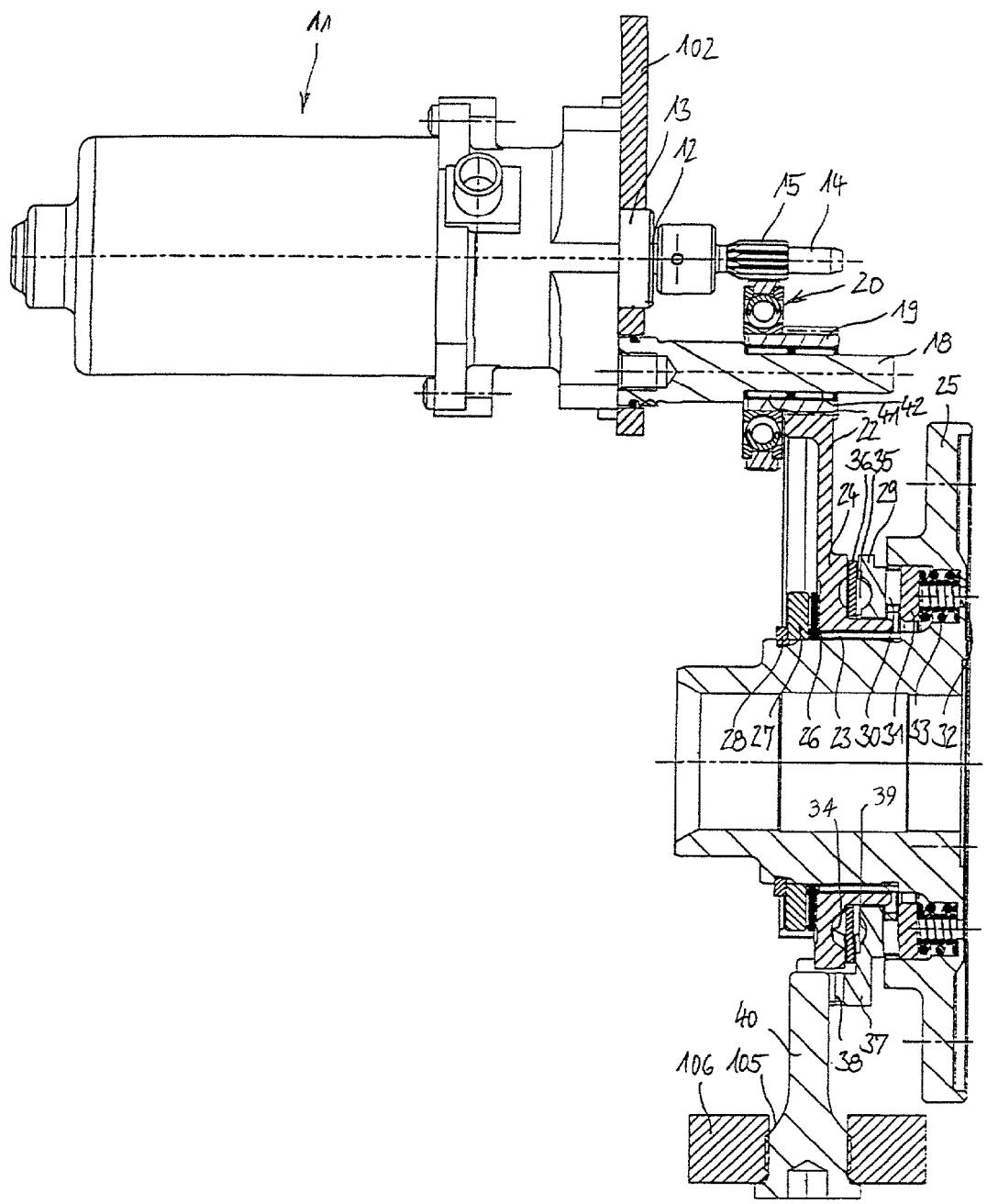
FIG. 1 is an axial section through an inventive device according to a first embodiment with spring mechanisms in a multi-disc gear.

FIG. 1 shows an axial setting device according to the present invention in a mounted condition. The end of a motor shaft 12 projects from a housing 13 of the driving motor 11. The motor housing 13 is inserted into a centering bore 101 in a housing wall 102 in bore 103. A shaft journal 14 with a driving pinion 15 is positioned on the shaft end 12. A bearing journal 18 on which a sleeve pinion 19 is directly supported via two needle bearings 41, 42 is inserted into the housing wall 102. A multi-part gear 20 engaging the pinion 15 is pressed on to the sleeve pinion 19. Further details regarding the gear 20 will be described below. Via its toothing, the sleeve pinion 19 engages a tooth segment 22 which is firmly connected to a first disc 24 of the adjusting device. Via a needle bearing 23, the first disc 24 is rotatably supported on the projection of the cover 25 on which it is axially supported via an axial bearing 26, a disc 27 and a securing ring 28. The rotatingly drivable first disc 24 co-operates with a second disc 29 which is slidingly supported on a projection at the first disc 24 and which, via an axial bearing 30 and a disc 31, is supported on a first spring mechanism in the form of pressure springs 33 in the coupling cover 25. The helical pressure springs 33 are arranged so as to extend in an axis-parallel way relative to the second disc 29. Pressure pins 32 forming the setting members are positioned in the pressure springs 33. In the faces of the first and second discs 24, 29 which face one another, there are provided pairs of grooves 34, 39 whose depth is circumferentially variable and in which there run balls 35 held in a ball cage 36. Each of the grooves 34, 39 extends from a first stop with the greatest groove depth to a second stop with the smallest groove depth.

The second disc 29 comprises a radial projection 37 with a guiding claw 38. The guiding claw 38, in a longitudinally displaceable way, slides on a holding pin 40 which is firmly inserted in a bore 105 in a housing wall 106 and which, in this way, holds the axially displaceable second disc 29 in a rotationally fast way.

Figure 2A:
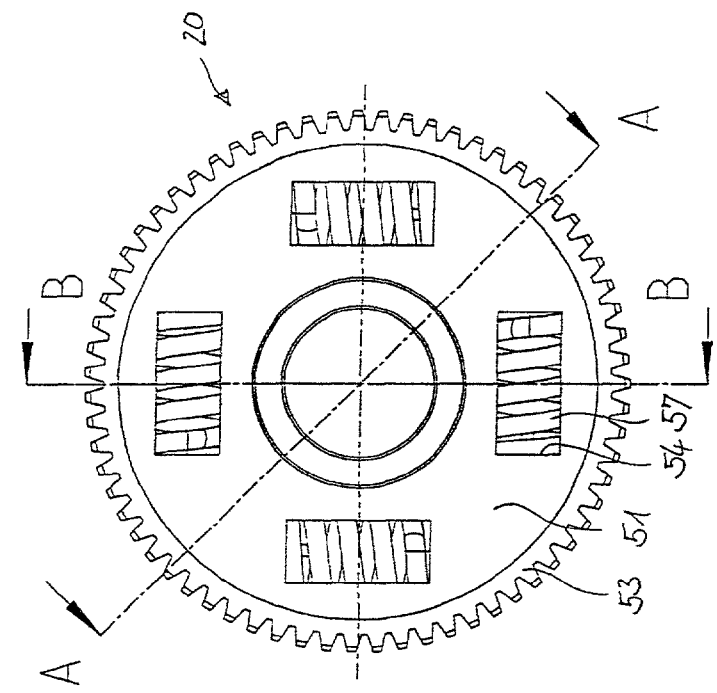
FIG. 2 shows a multi-disc gear according to FIG. 1 in the form of a detail
 A) in an axial view;
 B) in an axial section along line A—A; and
 C) in an axial section along line B—B.
Figure 2B:
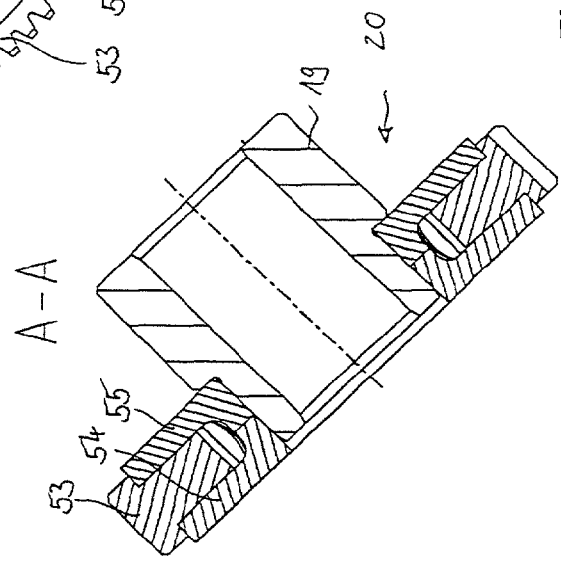
Figure 2C:
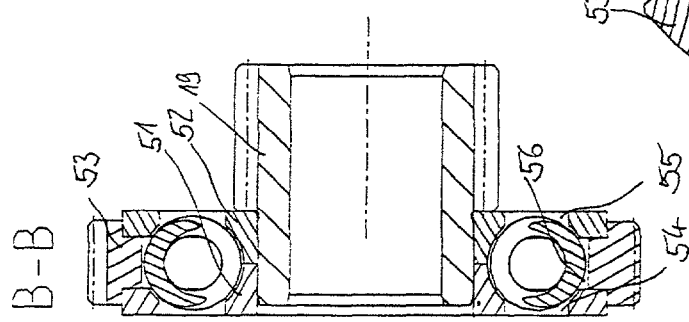

FIG. 2 shows the gear 20 in the form of an enlarged detail, with the individual parts being described jointly below. The gear 20 comprises two hub discs 51, 52 which are pressed directly on to the sleeve pinion 19. Between the two, a gear rim 53 is axially fixed but rotationally movable, while allowing the required axial play. Both the hub discs 51, 52 and the gear rim 53 comprise window openings 54, 55 and inner apertures 56 respectively, which, in the circumferential direction, all have approximately the same length and into which there are jointly inserted second spring mechanisms such as helical pressure springs 57 which are held in position by the window openings 54, 55 and inner apertures 56 respectively and are supported on the ends of the openings 54, 55 and apertures 56 respectively. Consequently, when the hub discs 51, 52 are rotated relative to the gear rim 53, the helical pressure springs 57 are axially shortened. Such shortening generates a returning force which acts against the relative rotation.

If the adjusting device is adjusted positively by the driving motor 11, this causes the first disc 24 to rotate, as a result of which the balls 35 running from deeper ball groove regions to shallower ball groove regions axially displace the second disc 29 on the cover projection against a returning force of the springs 33. The cover 25 normally forms part of a coupling carrier of a locking coupling in a differential drive. When the adjusting device is returned, the first disc 24 is rotated back by the driving motor 11 in the opposite direction until the balls 35 reach the end positions in the ball grooves 34, 39. The resulting abrupt braking of the first disc 24 is not directly transmitted to the rotor mass of the driving motor because the gear 20, while the pressure springs 57 are being shortened, permits overshooting so that only the relatively small mass of the sleeve pinion 19 is braked in an uncushioned way, whereas the greater rotor mass is cushioned. The driving motor is normally a frequency-modulated electric motor.

Figure 3A:
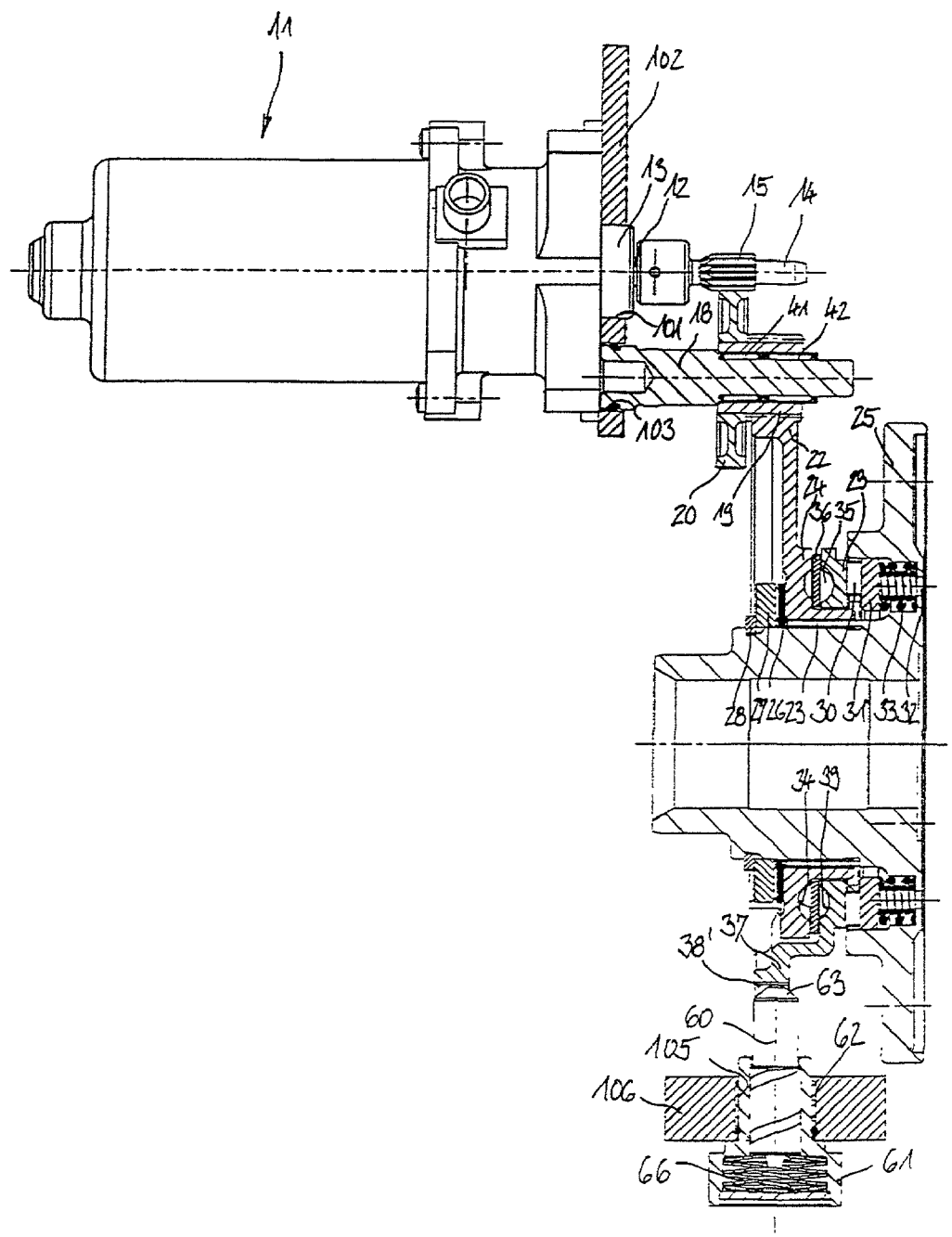
FIG. 3 shows an inventive device according to a second embodiment with elastically resilient holding pins:
 A) in an axial section; and
 B) in an axial view.
Figure 3B:
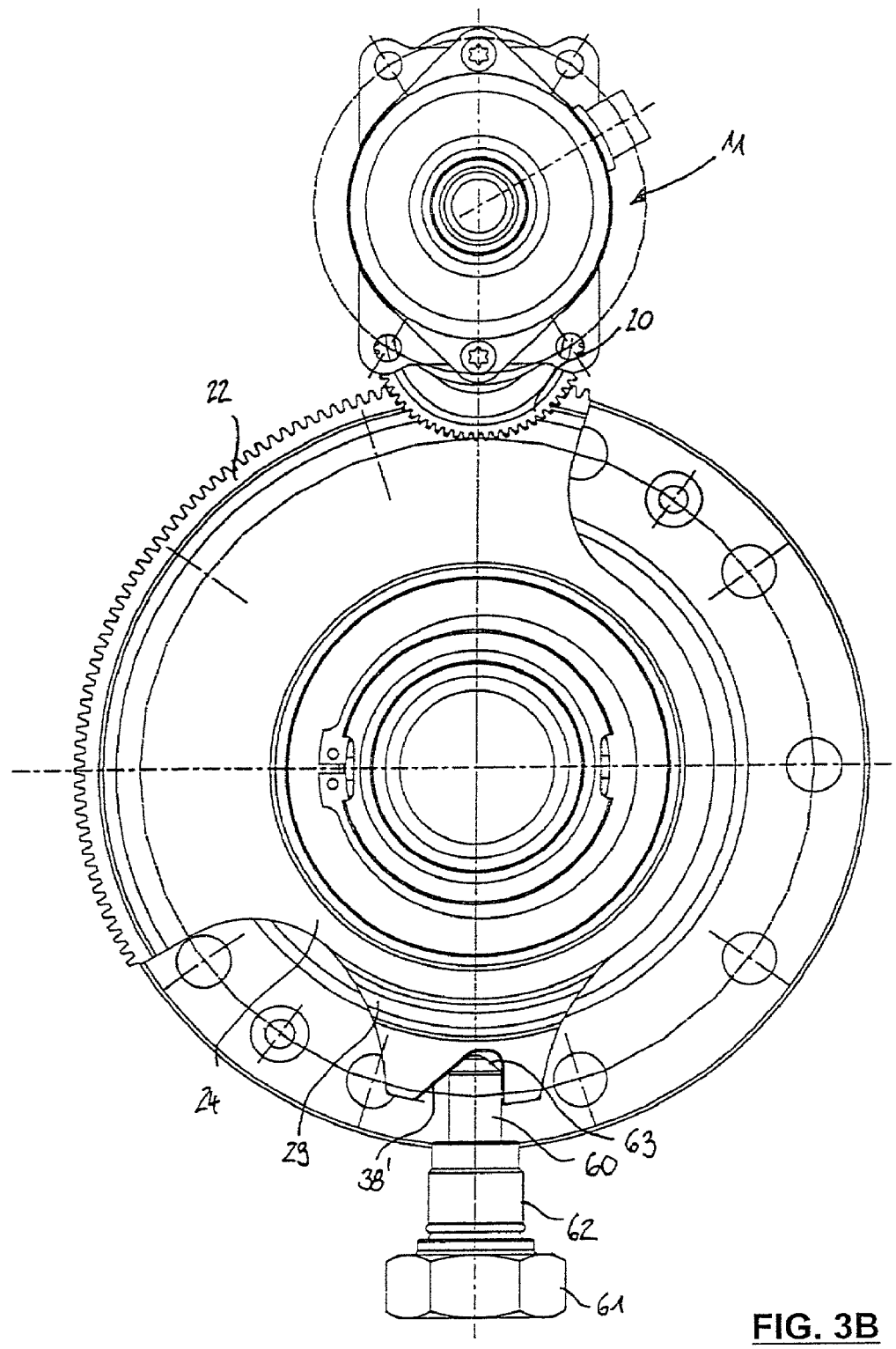

FIG. 3 shows an axial setting device in accordance with the present invention in a mounted condition. FIG. 3B shows an axial view of the device of FIG. 3A. FIGS. 3A and 3B will be described jointly below. The end of a motor shaft 12 projects from a housing 13 of the driving motor 11. The motor housing 13 is inserted into a centering bore 101 in a housing wall 102. A shaft journal 14 with a driving pinion 15 is positioned on the shaft end 12. A bearing journal 18 on which a sleeve pinion 19 is directly supported via two needle bearings 41, 42 is inserted into the housing wall 102 in bore 103. A gear 20 engaging the pinion 15 is pressed on to the sleeve pinion 19. Via its toothing, the sleeve pinion 19 engages a tooth segment 22 which is firmly connected to a first disc 24 of the adjusting device. Via a needle bearing 23, the first disc 24 is rotatably supported on the projection of the cover 25 on which it is axially supported via an axial bearing 26, a disc 27 and a securing ring 28. The rotatingly drivable first disc 24 cooperates with a second disc 29 which is slidingly supported on a projection at the first disc 24 and which, via an axial bearing 30 and a disc 31, is supported on a first spring mechanism in the form of pressure springs 33 in the coupling cover 25. The helical pressure springs 33 are arranged so as to extend in an axis-parallel way relative to the second disc 29. Pressure pins 32 forming the setting members are positioned in the pressure springs 33. In the faces of the first and second discs 24, 29 which face one another, there are provided pairs of grooves 34, 39 whose depth is circumferentially variable and in which there run balls 35 held in a ball cage 36. Each of the grooves 34, 39 extends from a first stop with the greatest groove depth to a second stop with the smallest groove depth.

The second disc 29 comprises a radial projection 37 with a guiding groove 38'. The guiding groove 38', in a longitudinally displaceable way, slides on a multi-part holding pin 60 which, by way of a semi-spherical head 63, engages the guiding groove 38' and which, in this way, holds the axially displaceable second disc 29 in a rotationally fast way. The holding pin 60 is supported in a sleeve member 61 so as to extend radially relative to the disc axis and is resiliently supported thereon via plate pressure springs 66. The sleeve member 61, by way of a thread 62, is directly threaded into a bore 105 in the housing wall 106.

If the adjusting device is adjusted positively by the driving motor 11, this causes the first disc 24 to rotate, as a result of which the balls 35 running from deeper ball groove regions to shallower ball groove regions axially displace the second disc 29 on the cover projection against a returning force of the springs 33. The cover 25 normally forms part of a coupling carrier of a locking coupling in a differential drive. When the adjusting device is returned, the first disc 24 is rotated back by the driving motor 11 in the opposite direction until the balls 35 reach the end positions in the ball grooves 34, 39. The resulting braking of the first disc 24 is cushioned in that the first disc 24 and the second disc 29 overshoot, with the plate springs 66 being shortened, so that the entire gear drive is braked in a cushioned way, i.e. in particular also the rotor mass. The cone of the holding pin 60 rises in the wedge-shaped guiding groove 38' which, towards one side, rises steeply. Via the balls resting against the end stops, the two discs 24, 29 remain firmly coupled. The driving motor is normally a frequency-modulated electric motor.

Figure 4:
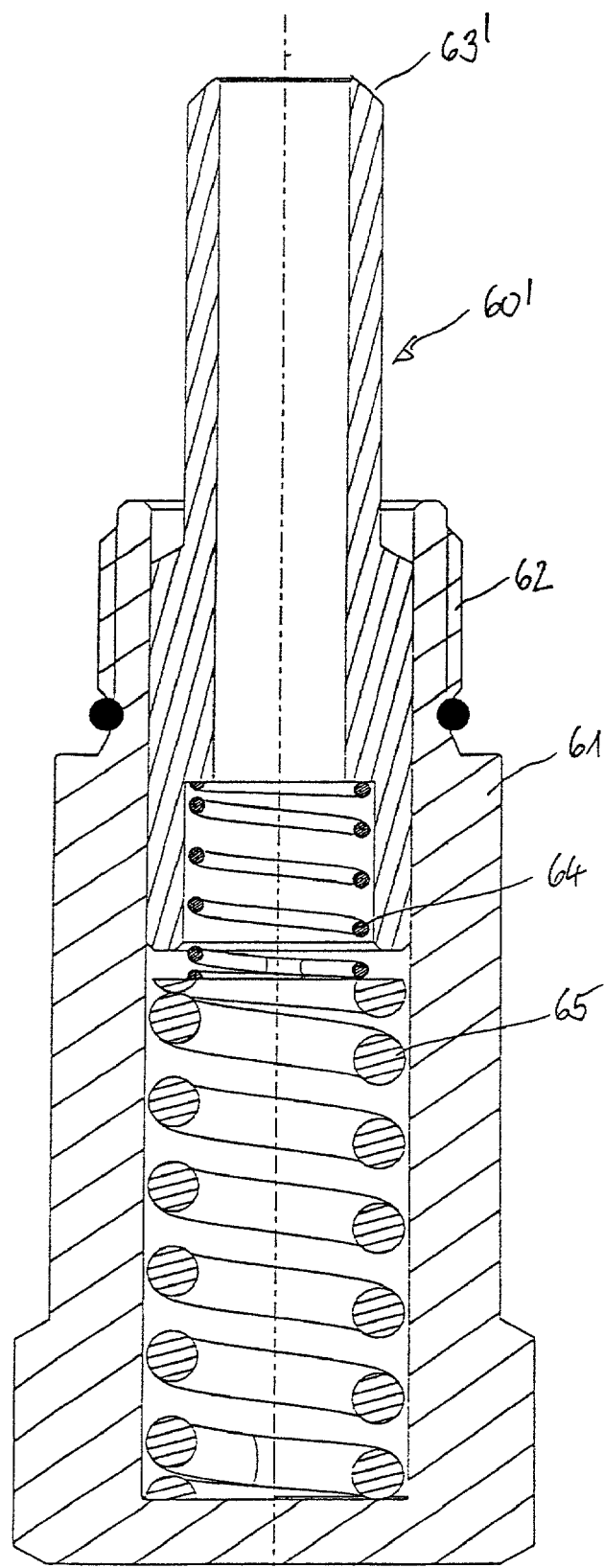
FIG. 4 shows a holding pin as an enlarged detail in a design which is modified as compared to FIG. 3.

FIG. 4 shows the resilient holding pin 60' in a second embodiment in the form of an enlarged detail. The holding pin 60' is resiliently supported via two helical pressure springs 64, 65 in the sleeve member 61. Instead of the semi-spherical head, there is provided a cone 63'.

Figure 5:
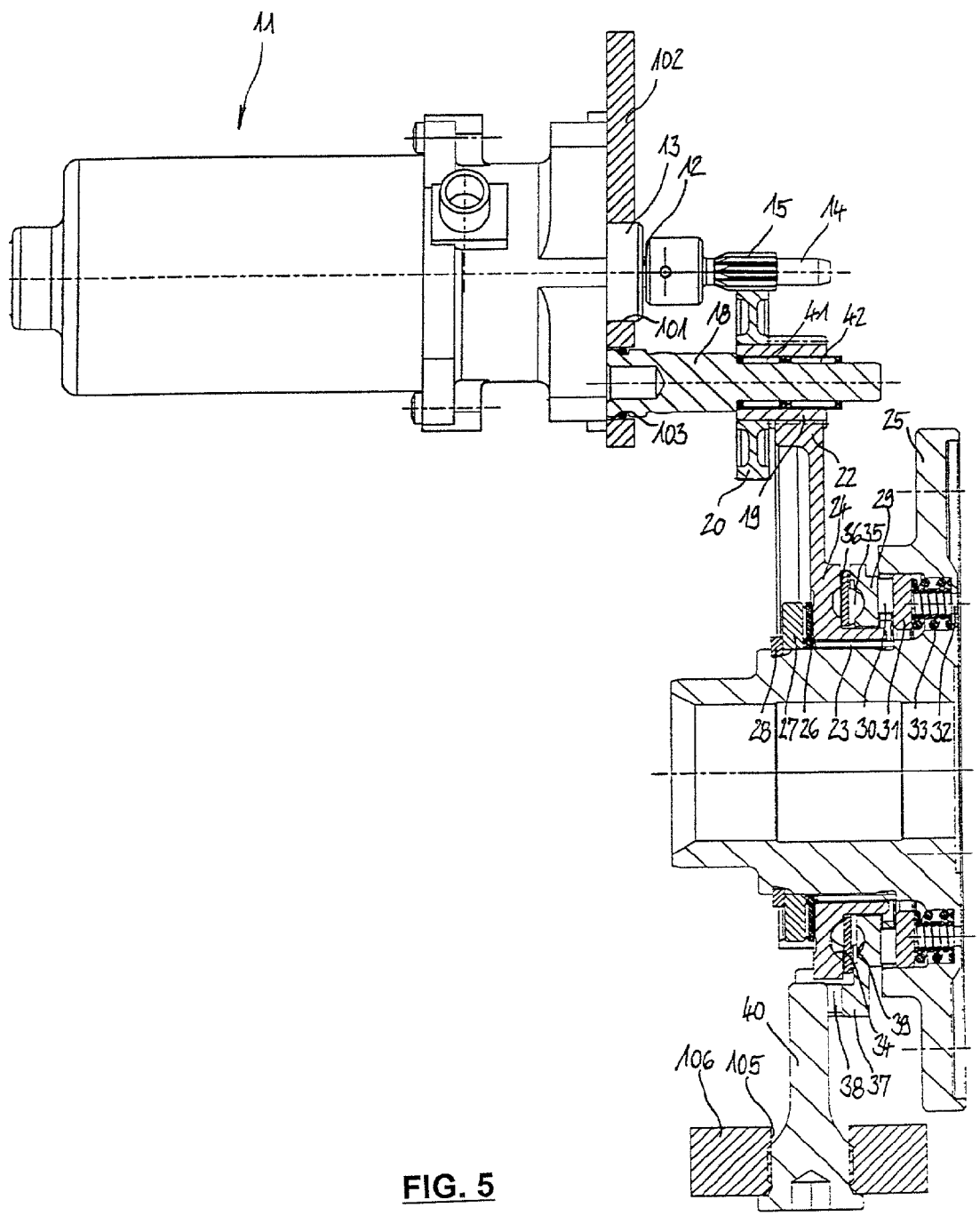
FIG. 5 is an axial section through an inventive device according to a third embodiment with a ball groove shape co-operating with the spring mechanism.

FIG. 5 shows an axial setting device according to the present invention in a mounted condition. The end of a motor shaft 12 projects from a housing 13 of the driving motor 11. The motor housing 13 is inserted into a centering bore 101 in a housing wall 102. A shaft journal 14 with a driving pinion 15 is positioned on the shaft end 12. A bearing journal 18 on which a sleeve pinion 19 is directly supported via two needle bearings 41, 42 is inserted into the housing wall 102 in bore 103. A gear 20 engaging the pinion 15 is pressed on to the sleeve pinion 19. By way of its toothing, the sleeve pinion 19 engages a tooth segment 22 which is firmly connected to a first disc 24 of the adjusting device. Via a needle bearing 23, the first disc 24 is rotatably supported on the projection of the cover 25 on which it is axially supported via an axial bearing 26, a disc 27 and a securing ring 28. The rotatingly drivable first disc 24 cooperates with a second disc 29 which is slidingly supported on a projection at the first disc 24 and which, via an axial bearing 30 and a disc 31, is supported on a first spring mechanism in the form of pressure springs 33 in the cover 25. The helical pressure springs 33 are arranged so as to extend in an axis-parallel way relative to the second disc 29. Pressure pins 32 forming the setting members are positioned in the pressure springs 33. In the faces of the first and second discs 24, 29 which face one another, there are provided pairs of grooves 34, 39 whose depth is circumferentially variable and in which there run balls 35 held in a ball cage 36.

The second disc 29 comprises a radial projection 37 with a guiding claw 38. The guiding claw 38, in a longitudinally displaceable way, slides on a holding pin 40 which is firmly inserted in a bore 105 in a housing wall 106 and which, in this way, holds the axially displaceable second disc 29 in a rotationally fast way.

FIG. 6 shows the second disc 29 of FIG. 5 in an axial view, with the projection 37 and the guiding claw 38 being shown in the form of details. This illustration shows the shape of the ball grooves 39 in detail. They extend from a first axial stop region 71 with a greater depth at the end A to a second axial stop 72 with a smaller depth at the end B. In a plan view, the ball grooves in the first disc 24 are identical, so that pairs of grooves can be made to overlap with their respective first ends A, with the ball resting against the first end stops A and with the discs being in their closest positions. A rotation of the discs relative to one another causes the balls in both grooves of a pair of grooves to run towards the ends B, as a result of which the axially movable second disc 29 moves away from the axially supported first disc 24.

FIG. 6B shows the track shape according to FIGS. 1 to 4, wherein the ball stops 71, 72 are provided at the shallowest point A and at the flattest point B of the ball groove 39 and comprise the shape of a spherical cup.

FIG. 6C shows the ball groove shape according to FIG. 5, wherein the deepest point of the ball groove 39 at the end A does not form the stop. Instead, there is provided a rising run-out portion 73 which, if the discs are rotated further beyond their end position, again causes the discs to move away from one another, so that the pressure springs 33 are shortened once again, as a result of which the rotor mass and the entire rotational mass of the drive are cushioned by the returning force of the pressure springs 33 when overshooting their end positions.

Figure 7B:
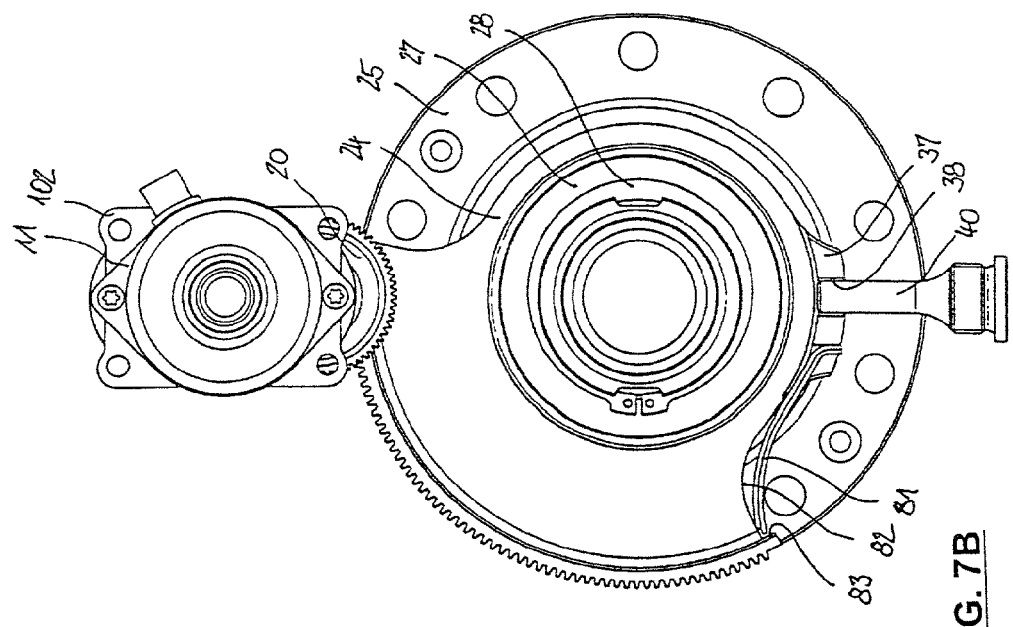
FIG. 7 shows an inventive device according to a fourth embodiment with spring mechanisms which act between the discs, in a first variant
 A) in an axial section; and
 B) in an axial view.
Figure 7A:
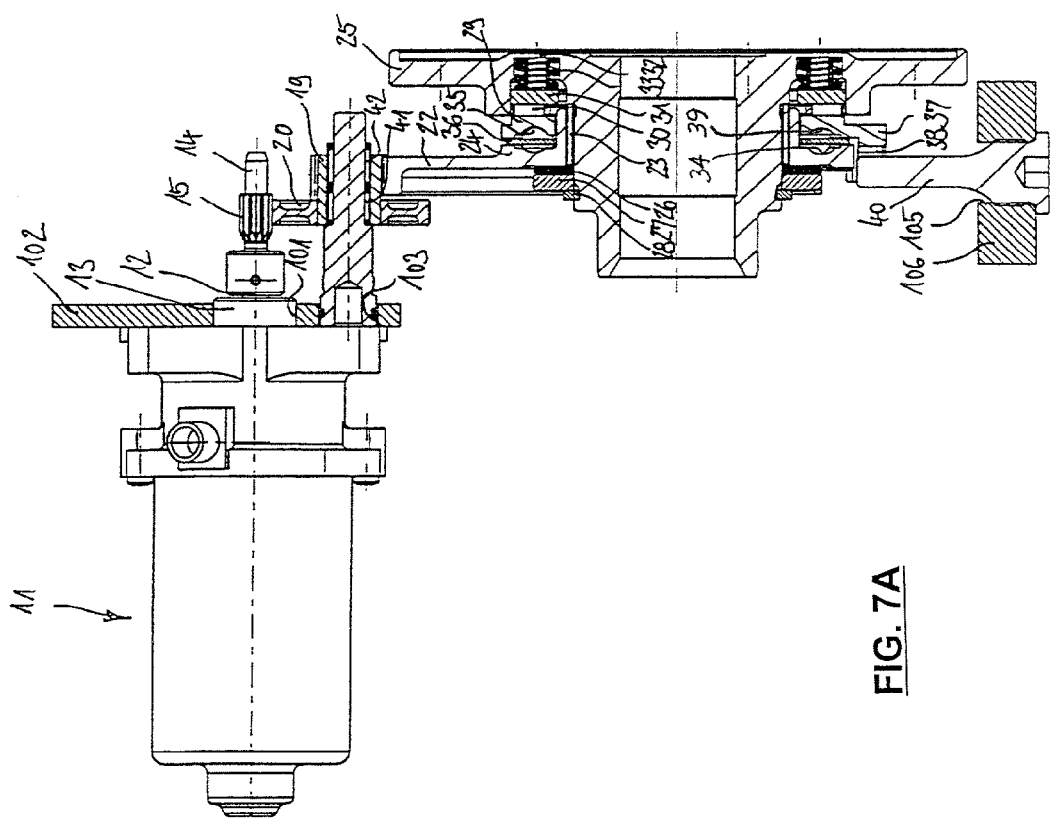

FIG. 7A shows an inventive axial adjusting device in a mounted condition. The end of a motor shaft 12 projects from a housing 13 of the motor 11. The motor housing 13 is inserted into a centering bore 101 in a housing wall 102. A shaft journal 14 with a driving pinion 15 is positioned on the shaft end 12. A bearing journal 18 on which a sleeve pinion 19 is directly supported via two needle bearings 41, 42 is inserted into the housing wall 102 in a bore 103. A gear 20 engaging the pinion 15 is pressed on to the sleeve pinion 19. Via its toothing, the sleeve pinion 19 engages a tooth segment 22 which is firmly connected to a first disc 24 of the adjusting device. Via a needle bearing 23, the first disc 24 is rotatably supported on the projection of the cover 25 on which it is axially supported via an axial bearing 26, a disc 27 and a securing ring 28. The rotatingly drivable first disc 24 cooperates with a second disc 29 which is slidingly supported on a projection at the first disc 24 and which, via an axial bearing 30 and a disc 31, is supported on a first spring mechanism in the form of pressure springs 33 in the cover 25. The helical pressure springs 33 are arranged so as to extend in an axis-parallel way relative to the second disc 29. Pressure pins 32 forming the setting members are positioned in the pressure springs 33. In the faces of the first and second discs 24, 29 which face one another, there are provided pairs of grooves 34, 39 whose depth is circumferentially variable and in which there run balls 35 held in a ball cage 36. Each of the grooves 34, 39 extends from a first stop with a greatest groove depth to a second stop with the smallest groove depth.

The second disc 29 comprises a radial projection 37 with a guiding claw 38. The guiding claw 38, in a longitudinally displaceable way, slides on a holding pin 40 which is firmly inserted in a bore 105 in a housing wall 106 and which, in this way, holds the axially displaceable second disc 29 in a rotationally fast way.

The plan view of FIG. 7B shows that, at the projection 37 of the second disc 29, there is affixed a leaf spring 81 whose free end cooperates with a stop curve 82 at the tooth segment 22 of the first disc 24. Initially, the end of the leaf spring 81 slides along the stop curve 82 while generating friction forces until it stops at a stop 83 at the tooth segment 22, with the leaf spring being shorted during further rotation. In this embodiment, effective engagement of the leaf spring at the stop 83 takes place prior to the balls having reached the end stops in the ball grooves.

Figure 8B:
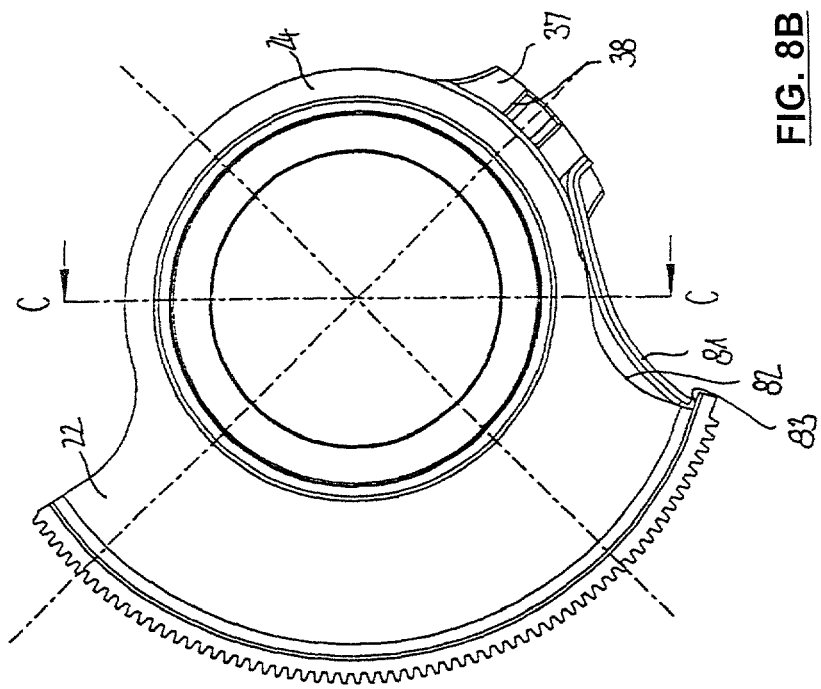
FIG. 8 shows the two discs with a leaf spring according to FIG. 7 in the form of a detail:
 A) in an axial section along line C—C of FIG. 8B;
 B) in an axial view; and
 C) in a perspective view.
Figure 8A:
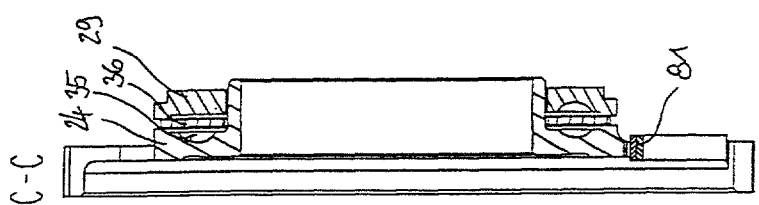
Figure 8C:
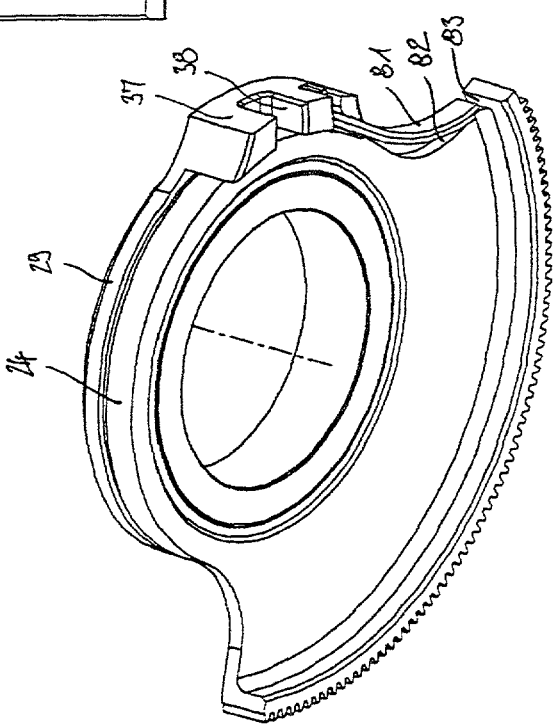

FIGS. 8A, 8B and 8C show additional views of the first and second discs 24, 29 of FIGS. 7A and 7B. In FIGS. 8A–8C, any details which are identical to those shown in FIG. 7 have been given the same reference numbers. To that extent, reference is made to the above description. Further details do not need to be mentioned.

FIG. 9 shows an axial setting device according to the present invention in a mounted condition. The end of a motor shaft 12 projects from a housing 13 of the motor 11. The motor housing 13 is inserted into a centering bore 101 in a housing wall 102. A shaft journal 14 with a driving pinion 15 is positioned on the shaft end 12. A bearing journal 18 on which a sleeve pinion 19 is directly supported on the journal 18 via two needle bearings 41, 42 is inserted into the housing wall 102 in a bore 103. A gear 20 engaging the pinion 15 is pressed on to the pinion sleeve 19. Further details regarding the gear 20 will be given below. Via its toothing, the sleeve pinion 19 engages a tooth segment 22 which is firmly connected to a first disc 24 of the adjusting device. Via a needle bearing 23, the first disc 24 is rotatably supported on the projection of the cover 25 on which it is axially supported via an axial bearing 26, a disc 27 and a securing ring 28. The rotatingly drivable first disc 24 cooperates with a second disc 29 which is slidingly supported on a projection at the first disc 24 and which, via an axial bearing 30 and a disc 31, is supported on a first spring mechanism in the form of pressure springs 33 in the coupling cover 25. The helical pressure springs 33 are arranged so as to extend in an axis-parallel way relative to the second disc 29. Pressure pins 32 forming the setting members are positioned in the pressure springs 33. In the faces of the first and second discs 24, 29 which face one another, there are provided pairs of grooves 34, 39 whose depth is circumferentially variable and in which there run balls 35 held in a ball cage 36. Each of the grooves 34, 39 extends from a first stop with a greatest groove depth to a second stop with a smaller groove depth.

The second disc 29 comprises a radial projection 37 with a guiding claw 38. The guiding claw 38, in a longitudinally displaceable way, slides on a holding pin 40 which is firmly inserted in a bore 105 in a housing wall 106 and which, in this way, holds the axially displaceable second disc 29 in a rotationally fast way.

In the plan view of FIG. 9B, the leaf spring between the two discs explained with reference to FIG. 7B is replaced by a resilient element 91 which is fixed to the projection 37 of the second disc 29 and which is acted upon by a buffer web 92 affixed by bolts 93, 94 to the disc segment 22. The buffer web 92 effectively stops against the resilient element 91 even before the balls have reached the end stops in the ball grooves. The resilient element 91 is preferably elastic rubber or plastic having internal damping.

Figure 9B:
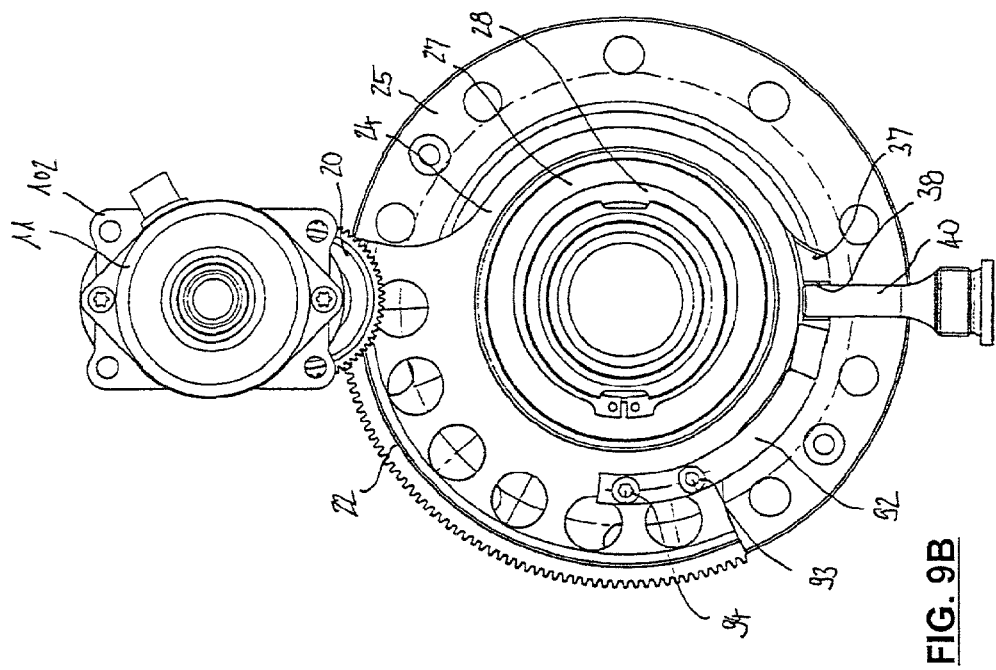
FIG. 9 shows an inventive device according to a fourth embodiment with spring mechanisms which act between the discs, in a second variant,
 A) in an axial section; and
 B) in an axial view.
Figure 9A:
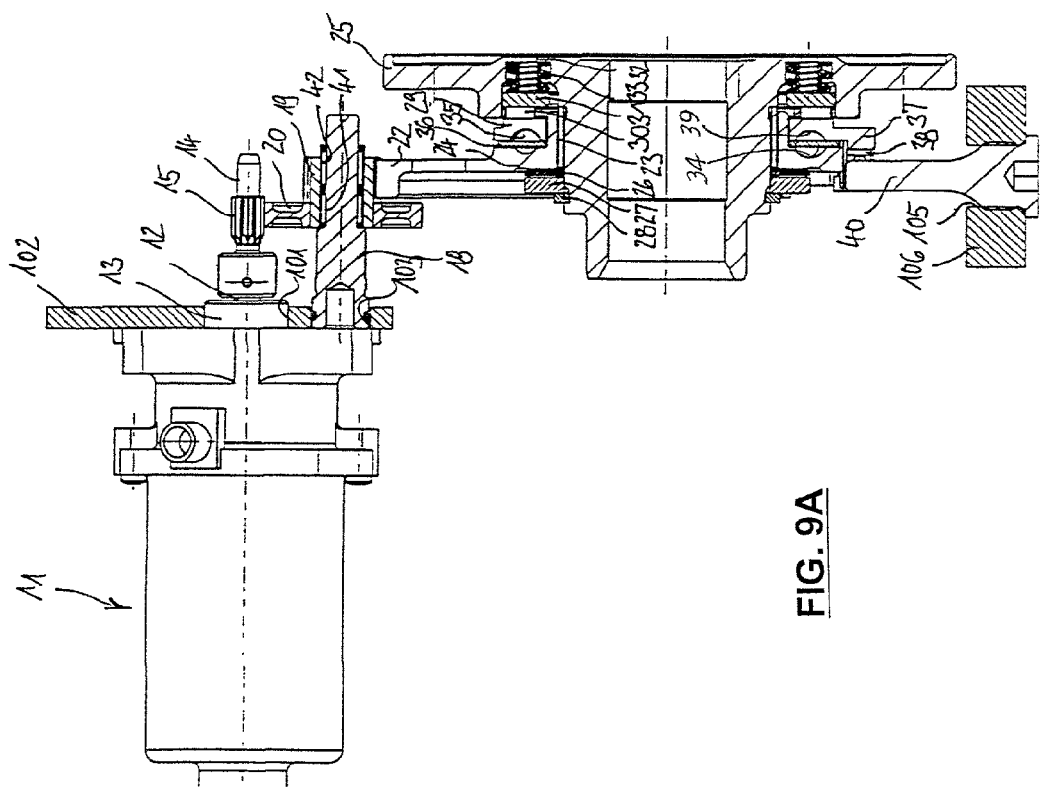
Figure 10C:
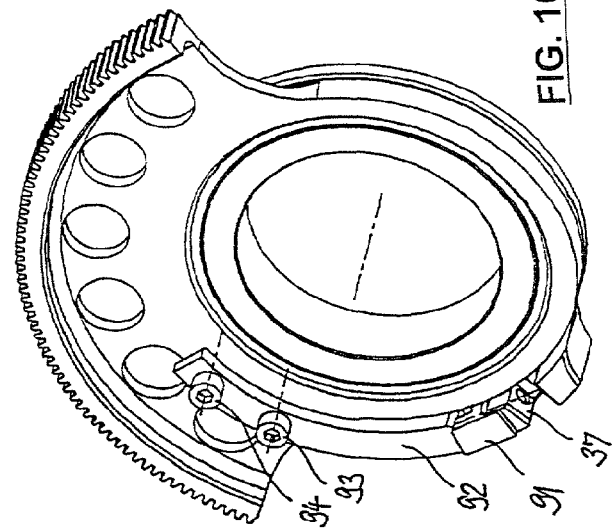
FIG. 10 shows the two discs according to FIG. 9 in the form of a detail:
 A) in an axial section along line A—A of FIG. 10B;
 B) in an axial view;
 C) in a perspective view; and
 D) in the form of a detail along line C—C of FIG. 10B.
Figure 10B:
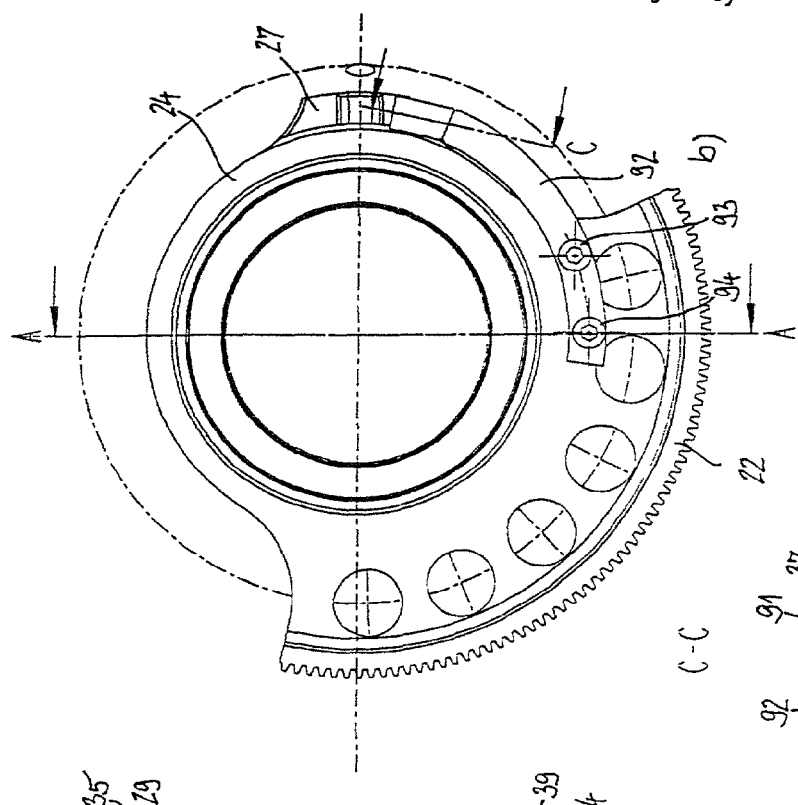
Figure 10D:
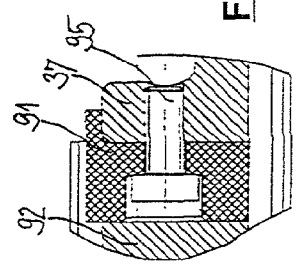
Figure 10A:
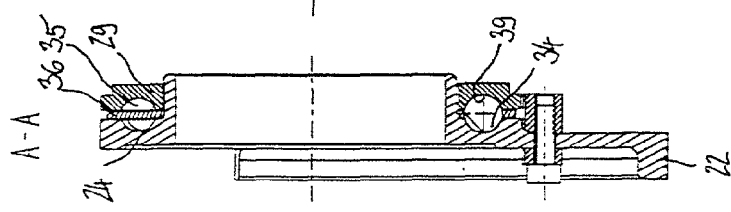

FIGS. 10A–10D show additional views of the first and second discs 24, 29 of FIGS. 9A and 9B. In addition to the details previously discussed with respect to FIGS. 9A and 9B, FIG. 10D shows a bolt 95 which holds the resilient element 91 at the projection 27.

When the disc 24 is rotated back by the driving motor 11, the spring mechanisms of the devices according to FIGS. 7 to 10 ensure that, even before the end stops in the ball grooves are reached, the rotor mass and the entire rotational mass of the drive are braked relative to the second disc 29, held in a rotationally fast way, before the end stops in the ball grooves are reached. Thereafter, the effect of the spring elements will be to achieve a certain amount of turning back from the end stops to the extent that this is possible relative to the returning force of the helical pressure springs 33.

From the foregoing, it can be seen that there has been brought to the art a new and improved axial adjusting device. While the invention has been described in connection with one or more embodiments, it should be understood that the invention is not limited to those embodiments. Thus, the invention covers all alternatives, modifications, and equivalents be included in the spirit and scope of the appended claims.

What is claimed is:

1. An axial adjusting device comprising first and second discs which are rotatable and coaxially supported relative to one another, and balls between said first and second discs guided in pairs of ball grooves, wherein the depth of said pairs of ball grooves is variable across a circumference of the first and second discs, and wherein one of the first or second discs is axially supported and one of the first or second discs is axially displaceable against resilient returning forces of a first spring mechanism, which spring mechanism is supported on a third part and wherein at least one of the first and second discs is directly rotatingly driven by an electric motor via a gear drive, and wherein said device comprises a second spring mechanism which, during a return motion of the first and second discs, after the balls have reached end positions in the ball grooves, corresponding to a greatest groove depth, permits the axially displaceable disc to overshoot against resilient returning forces of the second spring mechanism; and wherein the gear drive comprises gears and one of the gears comprises hub elements and gear rim elements which are separate from one another and which are resiliently supported relative to one another by the second spring mechanism.

2. A device according to claim 1, wherein the second spring mechanism is a plurality of helical pressure springs which are positioned in the hub and gear rim elements in a circumferential direction.

3. An axial adjusting device comprising first and second discs which are rotatable and coaxially supported relative to one another, and balls between said first and second discs guided in pairs of ball grooves, wherein the depth of said pairs of ball grooves is variable across a circumference of the first and second discs, and wherein one of the first or second discs is axially supported and one of the first or second discs is axially displaceable against resilient returning forces of a first spring mechanism, which spring mechanism is supported on a third part and wherein at least one of the first and second discs is rotatingly driven by a motor via a pear drive, and wherein said device comprises a second spring mechanism which, during a return motion of the first and second discs, after the balls have reached end positions in the ball grooves, corresponding to a greatest groove depth, permits the axially displaceable disc to overshoot against resilient returning forces of the second spring mechanism; and wherein an undriven disc of the first and second discs is held by a holding element in a housing in a rotationally fast way, said holding element being supported by said second spring mechanism so as to be resiliently deflectable.

4. A device according to claim 3, wherein the holding element is a holding pin which is radially displaceable relative to the undriven disc of the first and second discs, and which engages a resting trough at the undriven disc edge and is resiliently supported in the housing via pressure springs.

5. An axial adjusting device comprising first and second discs which are rotatable and coaxially supported relative to one another, and balls between said first and second discs guided in pairs of ball grooves, wherein a depth of said pairs of ball grooves is variable across a circumference of the first and second discs, and wherein one of the first and second discs is axially supported and one of the first and second discs is axially displaceable against resilient returning forces of a first spring mechanism, which spring mechanism is supported on a third part and wherein at least one of the first and second discs is directly rotatingly driven by an electric motor via a gear drive, and wherein said device comprises a second spring mechanism which, during a return motion of the first and second discs, prior to the balls reaching end portions in the ball grooves, corresponding to a greatest groove depth, is resiliently pretensioned against a returning force by the balls.

6. A device according to claim 5, wherein the second spring mechanism comprises a leaf spring which is fixed to one of the first and second discs and whose free end cooperates with a stop at the other of the first and second discs.

7. A device according to claim 6, wherein the free end of the leaf spring slides along the other one of the first and second discs prior to reaching an end stop.

8. A device according to claim 5, wherein the second spring mechanism comprises an elastic rubber or plastic element which is fixed to one of the first and second discs and cooperates with a stop at the other of the first and second discs.

9. A device according to claim 8, wherein the rubber or plastic element comprises internal damping.

10. An axial adjusting device comprising first and second discs which are rotatable and coaxially supported relative to one another, and balls between said first and second discs guided in pairs of ball grooves, wherein the depth of said pairs of ball grooves is variable across a circumference of the first and second discs, and wherein one of the first or second discs is axially supported and one of the first or second discs is axially displaceable against resilient returning forces of a first spring mechanism, and wherein at least one of the first and second discs is rotatingly driven by a motor via a gear drive, and wherein said device comprises a second spring mechanism which, during a return motion of the first and second discs, after the balls have reached end positions in the ball grooves, corresponding to a greatest groove depth, permits the axially displaceable disc to overshoot against resilient returning forces of the second spring mechanism, wherein the gear drive comprises gears and one of the gears comprises hub elements and gear rim elements which are separate from one another and which are resiliently supported relative to one another by the second spring mechanism, and wherein the second spring mechanism is a plurality of helical pressure springs which are positioned in the hub and gear rim elements in a circumferential direction.

11. An axial adjusting device comprising first and second discs which are rotatable and coaxially supported relative to one another, and balls between said first and second discs guided in pairs of ball grooves, wherein the depth of said pairs of ball grooves is variable across a circumference of the first and second discs, and wherein one of the first or second discs is axially supported and one of the first or second discs is axially displaceable against resilient returning forces of a single spring mechanism, which spring mechanism is supported on a third part and wherein at least one of the first and second discs is directly rotatingly driven by an electric motor via a gear drive, and wherein said single spring mechanism, during a return motion of the first and second discs, after the balls have reached end positions in the ball grooves, corresponding to a greatest groove depth, permits the axially displaceable disc to overshoot against resilient returning forces of the spring mechanism, and wherein following the ball end positions determined by the greatest groove depth, the ball grooves each comprise a rising run-out portion.

12. A device according to claim 11, wherein the spring mechanism comprises a plurality of helical pressure springs arranged so as to extend in an axis-parallel way relative to the axially displaceable disc.

* * * * *

UNITED STATES PATENT AND TRADEMARK OFFICE
CERTIFICATE OF CORRECTION

PATENT NO. : 7,000,492 B2 Page 1 of 1
APPLICATION NO. : 10/175370
DATED : February 21, 2006
INVENTOR(S) : Karl-Heinz Hulsebusch et al.

It is certified that error appears in the above-identified patent and that said Letters Patent is hereby corrected as shown below:

Column 9,
Line 10, should read as follows: -- a gear drive, and wherein said device comprises a second --

Signed and Sealed this

Eighteenth Day of July, 2006

JON W. DUDAS
*Director of the United States Patent and Trademark Office*